United States Patent
Sharpe et al.

(10) Patent No.: US 12,443,802 B2
(45) Date of Patent: Oct. 14, 2025

(54) LARGE LANGUAGE MODEL SUMMARIZATION

(71) Applicant: Capital One Services, LLC, McLean, VA (US)

(72) Inventors: Samuel Sharpe, Cambridge, MA (US); Brian Barr, Schenectady, NY (US)

(73) Assignee: Capital One Services, LLC, McLean, VA (US)

(*) Notice: Subject to any disclaimer, the term of this patent is extended or adjusted under 35 U.S.C. 154(b) by 244 days.

(21) Appl. No.: 18/454,559

(22) Filed: Aug. 23, 2023

(65) Prior Publication Data

US 2025/0068858 A1    Feb. 27, 2025

(51) Int. Cl.
*G06F 40/40* (2020.01)
*G06F 40/166* (2020.01)
*G06N 3/045* (2023.01)

(52) U.S. Cl.
CPC ............ *G06F 40/40* (2020.01); *G06F 40/166* (2020.01); *G06N 3/045* (2023.01)

(58) Field of Classification Search
CPC ........ G06F 40/40; G06F 40/166; G06F 40/56; G06N 3/045; G06N 20/00
See application file for complete search history.

(56) References Cited

U.S. PATENT DOCUMENTS

| | | | |
|---|---|---|---|
| 2023/0281248 A1* | 9/2023 | Schalkwyk | G06F 16/739 707/749 |
| 2024/0355437 A1* | 10/2024 | Rockne | G06F 40/20 |
| 2025/0036884 A1* | 1/2025 | Walter | G06F 40/40 |
| 2025/0045308 A1* | 2/2025 | Rogynskyy | G06F 16/3334 |

* cited by examiner

*Primary Examiner* — Linda Wong
(74) *Attorney, Agent, or Firm* — Foley & Lardner LLP (57) ABSTRACT

A method and related system operations for summarizing information includes determining a plurality of local explainability parameters for a set of inputs using a local explainability model for a prediction model. The method further includes generating a plurality of feature effect indicators for a target prediction and generating a plurality of phrases based on the plurality of feature effect indicators by using a text generation model. The method further includes generating a summarization using a large language model based on the plurality of phrases.

20 Claims, 3 Drawing Sheets

LARGE LANGUAGE MODEL SUMMARIZATION

SUMMARY

Complex decision systems are employed in a wide range of applications, such as healthcare, utilities, and finance. These systems are designed to make decisions based on multiple variables and factors, taking into account various constraints and objectives. In simple systems, a comprehensive report on the values of these variables and factors may be sufficient to explain the particular description. However, real-world decision systems may become incredibly complex, and some decision systems may reach the same decision for very different reasons. Without additional operations, such decision systems threaten to become functionally useless as a result of their increasingly arcane nature.

Some embodiments may use a summarization model in conjunction with local explainability parameters to simplify these explanations. Some embodiments generate an aggregated summarization using a text generation model. Some embodiments may determine a plurality of local explainability parameters for a set of inputs using a local explainability model by providing a prediction model with the set of inputs. In some cases, the prediction models may output a first prediction based on the set of inputs that does not match a pre-determined target prediction. This mismatch may indicate that a user or other entity associated with the set of inputs is anomalous or may otherwise require further attention.

In addition to determining explainability parameters, some embodiments may generate a set of phrases to indicate a set of entities. In some embodiments, the phrases may be pre-generated templates that reflect a variable's effect on a decision. Alternatively, the phrases may include statements indicating an alternative set of values. For example, some embodiments may generate a plurality of conditionals indicating changes to the set of inputs to output the target prediction of the prediction model based on the plurality of local explainability parameters and the target prediction.

Various other aspects, features, and advantages will be apparent through the detailed description of this disclosure and the drawings attached hereto. It is also to be understood that both the foregoing general description and the following detailed description are examples and not restrictive of the scope of the invention.

BRIEF DESCRIPTION OF THE DRAWINGS

Detailed descriptions of implementations of the present technology will be described and explained through the use of the accompanying drawings.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
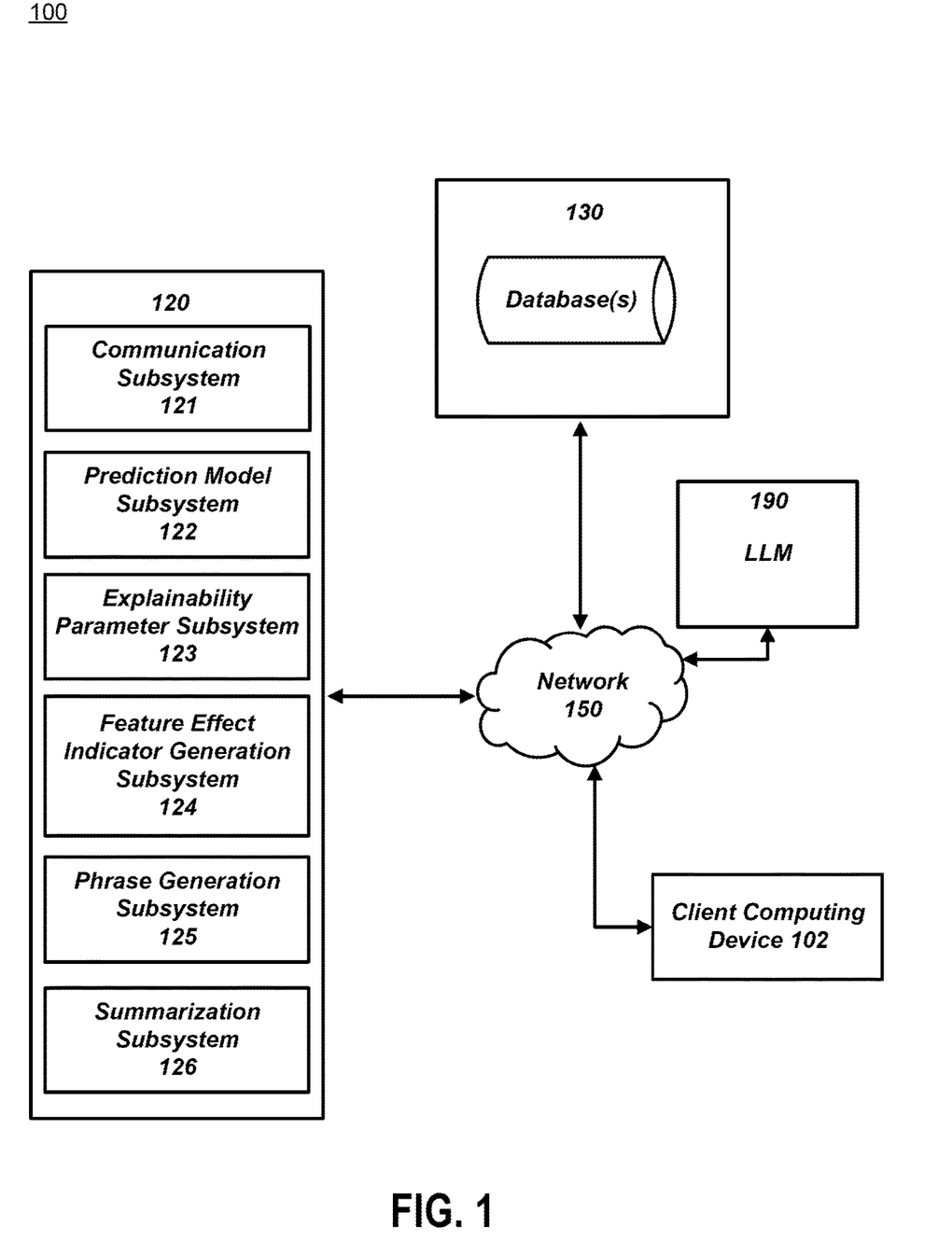
FIG. 1 illustrates a portion of an example system that generates summarizations, in accordance with some embodiments.

FIG. 1 illustrates a portion of an example system that generates summarizations, in accordance with some embodiments. A system 100 includes a client computing device 102. The client computing device 102 may include various types of computing devices such as a laptop computer, a desktop computer, a wearable headset, a smartphone, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 121-126, including generating summarizations of feature effect indicators. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an application programming interface (API) of a third-party service via the network 150 to perform prediction model training operations, obtain information, obtain model parameters, or use other services that perform one or more operations described in this disclosure. For example, some embodiments may use a large language model (LLM) to obtain summarizations by providing requests to an LLM server 190, where the requests may include one or more natural language phrases.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with a prediction model, predictions, previously used input feature values, previously determined feature effect indicators, etc. For example, data objects of the set of databases 130 may include a history of input feature values, a set of feature effect indicators associated with the input feature values, and a summarization generated based on the set of feature effect indicators.

In some embodiments, the communication subsystem 121 may retrieve information such as model parameters of a prediction model, inputs for a prediction model, model parameters for a text generation model, etc. For example, the communication subsystem 121 may obtain a set of input feature values provided by the client computing device 102. The communication subsystem 121 may further send instructions to perform one or more actions or data to other computing devices, such as the client computing device 102. For example, some embodiments may send one or more summarizations generated by the server 120 to the client computing device 102.

In some embodiments, a prediction model subsystem 122 may use a set of input feature values or other feature values to provide a set of predictions associated with the set of input feature values or other feature values. Some embodiments may use the prediction model subsystem 122 as a decision system and use the outputted predictions to effectuate one or more other operations. For example, some embodiments may use the prediction model subsystem 122 to generate a prediction that a user characterized by inputs provided by the client computing device 102 should be assigned to a target category value. The prediction model subsystem 122 may include one or more rules engines, one or more statistical systems, or one or more neural networks or other machine learning models. Furthermore, the prediction model subsystem 122 may process at least 5, at least 10, at least 20, at least 100, at least 1,000, or at least some other large number of inputs to formulate a prediction, where the number of inputs being processed or complexities in how they are processed may make simple explanations for an output prediction difficult to obtain.

In some embodiments, explainability parameter subsystem 123 may provide one or more local explainability parameters for a prediction model of the prediction model subsystem 122. For example, some embodiments may use a Local Interpretable Model-Agnostic Explanations (LIME)-based method to determine a set of local explainability parameters for each respective feature of a set of inputs used by the prediction model subsystem 122 to determine a prediction. As described elsewhere in this disclosure, some embodiments may then use the explainability parameters or values derived from the explainability parameters as inputs to determine a summarization. In some embodiments, a set of explainability parameters may provide a direct measurement of feature importance for a prediction model. Furthermore, as discussed elsewhere in this disclosure, the explainability parameters may be used as inputs for downstream operations or to otherwise configure a model used in downstream operations to determine what features to discuss in a summarization such that non-important features are ignored and important features are mentioned.

In some embodiments, a feature effect indicator generation subsystem 124 may provide one or more feature effect indicators associated with a set of inputs and a target prediction of a prediction model. A feature effect indicator may represent a value indicating a change necessary to a feature to achieve a target prediction. For example, a feature effect indicator may itself be a difference from a feature value threshold or include the difference, where the difference may represent an amount that the feature value may change to cause a prediction model to provide a target prediction. Alternatively, a feature effect indicator may include a value indicating an amount by which a set of feature values was changed in order for a target prediction to be obtained from a corresponding prediction model, where such a feature effect indicator may be represented by a counterfactual conditional (i.e., "conditional" or "counterfactual"). A feature effect indicator may represent the degree by which an entity characterized by an initial set of inputs must change in order for a prediction model to categorize the entity with a target category after a determination that the entity would not be predicted to be assigned with the target category based on the initial set of inputs.

In some embodiments, a phrase generation subsystem 125 may generate a set of phrases based on feature effect indicators generated by the feature effect indicator generation subsystem 124. As described elsewhere in this disclosure, the phrase generation subsystem 125 may use one or more types of methods to generate a phrase. For example, the phrase generation subsystem 125 may use a rule-based system to update one or more fields of a set of phrase templates to generate natural language phrases. Alternatively, the phrase generation subsystem 125 may use a text generation model to generate phrases based on the feature effect indicators provided by the feature effect indicator generation subsystem 124. As discussed elsewhere, some embodiments may use the generated phrases as inputs for an LLM to generate a summarization of the generated phrases. Furthermore, by first generating a set of phrases, some embodiments may provide an auditable trail to understand how a summarization for a complex set of inputs or complex decision system was achieved.

In some embodiments, a summarization subsystem 126 may use the explainability parameters provided by the explainability parameter subsystem 123 and the phrases provided by the phrase generation subsystem 125 to generate a set of summarizations by providing the local explainability parameters and the generated phrases to an LLM. For example, the summarization subsystem 126 may send a request that includes the set of explainability parameters and the phrases to the LLM server 190. The LLM server 190 may then provide a set of summarizations in response to the request. In some embodiments, the server 120 may then store one or more summarizations of the set of summarizations to the set of databases 130 or provide one or more summarizations of the set of summarizations to the set of databases 130.

Embodiments described in this disclosure may be able to provide more relevant or accurate summarizations in contrast to other types of summarizations due in part to the relationship between summarizations and explainability values or other values related to explanations. Furthermore, such summarizations may capture relationships that natural language documents written to explain a model do not accurately reflect. Additionally, summarizations produced using operations of this disclosure may provide input-specific summarizations (e.g., a summarization specific for a specific user record).

Figure 2:
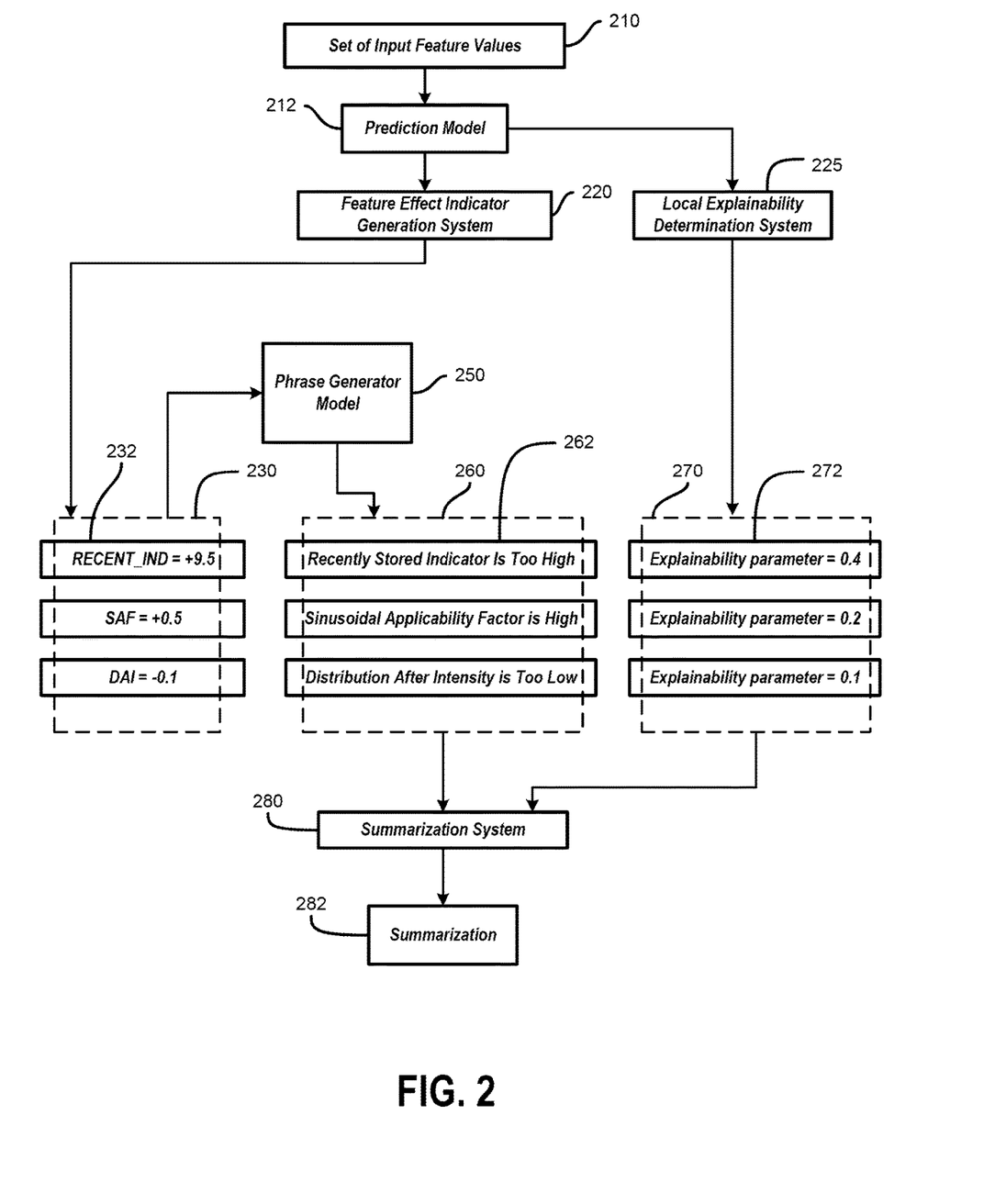
FIG. 2 illustrates a conceptual diagram of data structures involved in the generation of summarizations, in accordance with some embodiments.

FIG. 2 illustrates a conceptual diagram of data structures involved in the generation of summarizations, in accordance with some embodiments. Some embodiments may obtain a set of input feature values 210. The set of input feature values 210 may include information collected from a client computing device, such as a desktop computer, laptop computer, tablet computing device, etc. For example, some embodiments may receive input values from a user's interaction with the user interface (UI) displayed on a web browser of a tablet computing device. The input feature values may be values characterizing a user, another individual, an organization, etc. In some embodiments, the set of input feature values 210 may characterize an individual and may include information such as an income value, a geographic location, or a career category. The geographic location may include a latitude and longitude coordinate, a region identifier (e.g., a state name, a ZIP code, etc.), a physical address, etc.

Some embodiments may provide the set of input feature values to a prediction model 212 to obtain a prediction, where the prediction may include a category, a data type, etc. The prediction model 212 may include one of various types of prediction models, such as a neural network model, regression models, classification models, timeseries models, clustering models, ensemble models, or Bayesian models. For example, the prediction model 212 may include a neural network model, such as a recurrent neural network model having more than two neural unit layers. In some embodiments, the prediction model 212 may be modified between different instances to accommodate updates to a training model or a change in a set of input feature values.

Some embodiments may use a local explainability determination system 225 to generate a set of explainability parameters 270. The local explainability determination system 225 may use one or more various types of operations to determine the set of explainability parameters 270. For example, such operations may include LIME-based operations, Shapley Additive Explanations (SHAP)-based operations, or other local explainability operations. For example, some embodiments may determine the set of explainability parameters 270 by using a set of LIME-based operations. For example, some embodiments may determine a first explainability parameter 272 for a first feature "RECENT_IND" of the set of input feature values 210.

Some embodiments may then generate one or more conditionals with the use of a feature effect indicator generation system 220. The feature effect indicator generation system 220 may generate a set of feature effect indicators 230 using rules engines, counterfactual conditional generation models, neural networks, etc. For example, some embodiments may use a rules engine of the feature effect indicator generation system 220 that operates on a set of thresholds to determine whether a user should be classified as a first type or a second type of user. The feature effect indicators 230 are shown as symbolic representations indicating that an input feature value or other type of feature value for the prediction model 212 is too great or too low to satisfy a set of thresholds to achieve a target prediction. For example, as shown by a first feature effect indicator 232, the first feature "RECENT_IND" indicates that a feature value is too great by 9.5 and thus that reducing "RECENT_IND" by the feature value 9.5 may change or otherwise increase the likelihood of the prediction model 212 outputting a target prediction instead of a non-target prediction.

While the feature effect indicators 230 is shown as a set of symbolic statements, feature effect indicators may be represented in other ways. For example, some embodiments may use a feature effect indicator generation system to output a set of conditionals for use as feature effect indicators. A conditional may include a statement such as "RECENT_IND=>+0.35, SAF=>−0.3" to indicate that the input features "RECENT_IND" and "SAF" should be increased by the numeric value 0.35 and decreased by the numeric value 0.3, respectively. A conditional may be represented in a symbolic form such as a mathematical expression. Alternatively, a conditional may be represented as a natural language statement, such as a phrase or a sentence. Some embodiments may convert a symbolic expression conditional into a natural language phrase, where the natural language phrase may serve as either or both a conditional used to generate another phrase or as a phrase to provide as an input for an LLM, as described elsewhere in this disclosure.

In cases where a feature effect indicator such as a conditional indicates a feature value, some embodiments may store an association between an explainability parameter and an input or input value used to generate the explainability parameter. For example, some embodiments may associate, in a persistent or non-persistent memory, the first explainability parameter 272 with the first feature "RECENT_IND" and also with the input of the set of input feature values 210 corresponding with the first feature. Alternatively, or additionally, some embodiments may also store an association between a conditional or other feature effect indicator and the input or input value indicated by the feature effect indicator. Some embodiments may associate, in a persistent or non-persistent memory, the first feature effect indicator 232 and the first feature "RECENT_IND." Furthermore, some embodiments may store associations between data types that are derived from or associated with the same feature. For example, some embodiments may associate the first feature effect indicator 232 with the first phrase 262 and the first explainability parameter 272 based on a determination that each of these values is associated with the first feature "RECENT_IND."

Some embodiments may provide the first feature effect indicator 232 to a phrase generation model 250, where the phrase generation model 250 may then output a set of phrases 260. As described elsewhere in this disclosure, the phrase generation model 250 may include a rule-based system that fills in portions of a template to generate the set of phrases 260. For example, some embodiments may generate a first phrase 262 using the phrase generation model 250 based on the first feature effect indicator 232.

Alternatively, or additionally, some embodiments may use a text generation model to generate phrases from feature effect indicators. For example, some embodiments may provide, as a set of model inputs, the first feature effect indicator 232 to a text generation model to output a phrase based on the first feature effect indicator 232, where the text generation model may have been trained on a training set of phrases and their corresponding input feature effect indicators. Some embodiments may use a text generation model in view of a rule-based, template-filling model due to the increased adaptability of a text generation model to new data or data types.

Some embodiments may provide the set of phrases 260 and the set of explainability parameters 270 to the summarization system 280 in order to generate a set of summarizations 282. The summarization system 280 may include an LLM to generate the set of summarizations 282. The summarization system 280 may assign priority values to the set of phrases 260 based on the set of explainability parameters 270. Some embodiments may then provide the set of phrases 260 and their associated priority values to the LLM of the summarization system 280 to generate the set of summarizations 282. Alternatively, the summarization system 280 may access an LLM service to generate a summarization. For example, some embodiments may provide a set of requests that includes the set of phrases 260 and set of explainability parameters 270 to an API of the LLM service. Some embodiments then receive the set of summarizations 282 from the LLM service in response to the set of requests.

Figure 3:
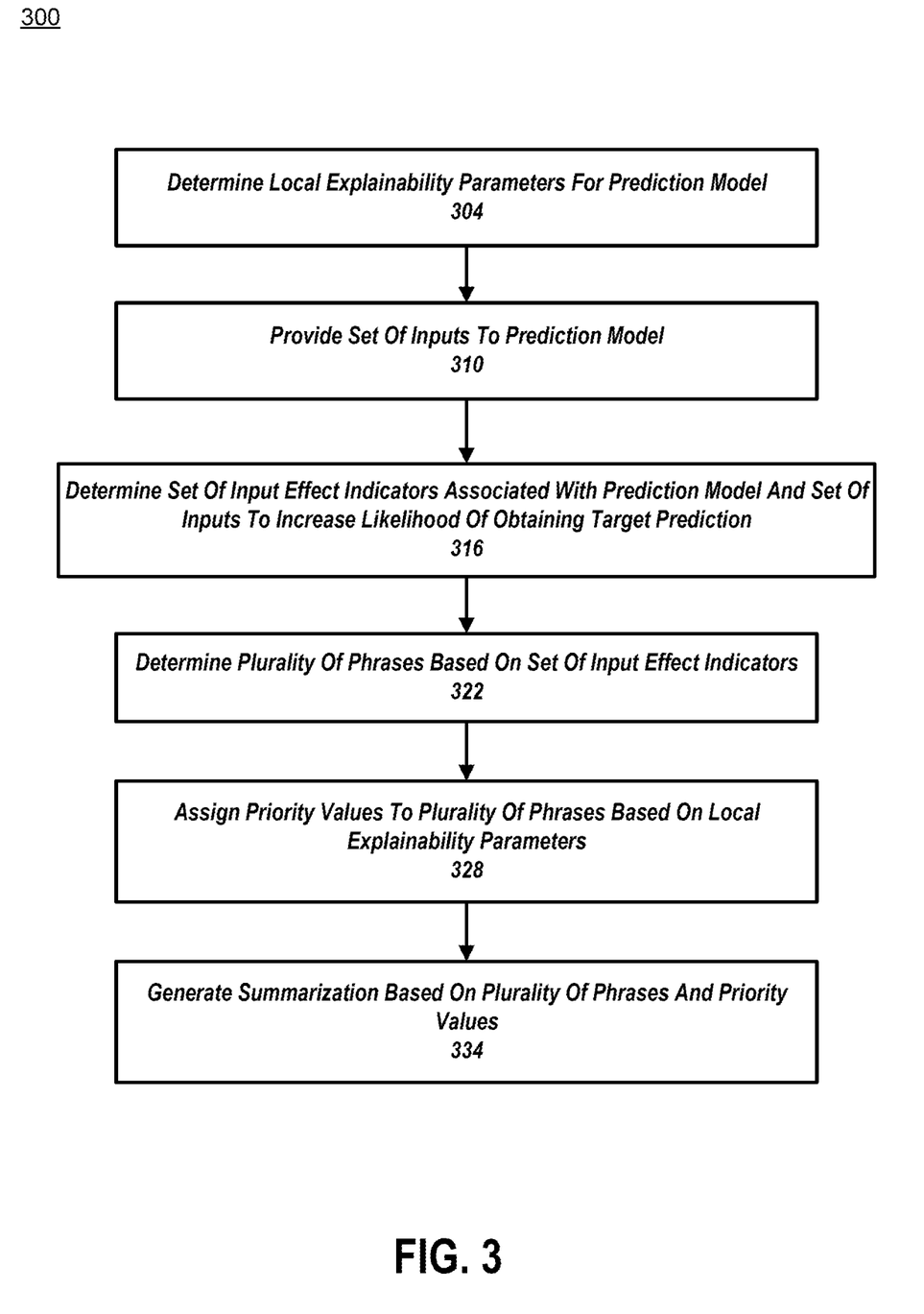
FIG. 3 is a flowchart of operations for an exemplary method to generate summarization explanations for decisions, in accordance with one or more embodiments.

FIG. 3 is a flowchart of operations for an exemplary method 300 to generate summarization explanations for decisions, in accordance with one or more embodiments. Some embodiments may determine local explainability parameters for a prediction model, as indicated by block 304. The local explainability parameters for a prediction model may indicate a relative importance of each input used by the prediction model with respect to a set of predicted outcomes of the prediction model. As described elsewhere in this disclosure, some embodiments may obtain a prediction for the set of inputs using the prediction model, where the prediction does not match a target prediction. For example, some embodiments may determine that an output prediction "Prediction_1" does not match the output prediction "Prediction_2."

Some embodiments can determine a set of local explainability parameters by using one or more local explainability models, such as feature importance model, gradient-based model, or permutation-based model. Some embodiments may examine activation patterns within a model for a single set of inputs corresponding with a single prediction of a prediction model or multiple sets of inputs corresponding with a multiple prediction of the prediction model. Some embodiments may employ perturbation operations by modifying input feature values and measuring changes or non-changes in a prediction model's output to determine the sensitivity of that input feature. Furthermore, as described elsewhere in this disclosure, the set of local explainability parameters may be assigned or otherwise associated with counterfactual conditionals or other characterizations of feature effects on obtaining a target prediction with the prediction model.

Some embodiments may use surrogate systems to model a more complex decision model. For example, some embodiments may use a decision tree or linear regression model trained on a local neighborhood of training inputs to approximate the behavior of the complex model. By using surrogate systems, some embodiments may better or more easily quantify the effects of a particular feature. For example, some embodiments may use a LIME-based method to obtain a plurality of local explainability parameters associated with features of a set of input feature values. To use a LIME-based method, some embodiments may randomly modify an input feature value of a set of input feature values multiple times to generate multiple modified sets of input feature values and then obtain a plurality of predictions for each modified input feature value set. Some embodiments may then train a linear regression model or decision tree model for use as a surrogate system to predict the plurality of predictions based on the modified sets of input feature values. Some embodiments may then use the surrogate model and the values of the perturbations used to generate the modified input feature values to determine a set of feature weights for the set of features of the set of input feature values. Some embodiments may then use the set of feature weights as a plurality of local explainability parameters for the set of features or otherwise compute the plurality of local explainability parameters based on the set of feature weights. Furthermore, as described elsewhere in this disclosure, some embodiments may use a plurality of local explainability parameters as inputs for an LLM or to modify parameters of an LLM to determine a summarization using the LLM.

Some embodiments may use other methods to determine a local explainability parameter. For example, some embodiments may use a SHAP model to determine a set of local explainability weights. After generating a set of modified input sets based on an initial input set for a prediction model, some embodiments may then provide the modified input sets to the prediction model to obtain a plurality of model predictions, where each model prediction of the plurality of model predictions corresponds with each respective modified input of the modified input sets. In some embodiments, the initial input set may be provided by a client computing device, obtained from a database of inputs, obtained from a configuration file or other data source providing a default set of values, etc. Some embodiments may then calculate a set Shapley values to quantify the effect of each feature of the inputs to the prediction model based on plurality of model predictions and the modified input sets. Some embodiments may then use the Shapley value as a set of local explainability parameters or to determine the set of local explainability parameters, where some embodiments may use the set of local explainability parameters for determining a summarization, as described elsewhere in this disclosure.

Some embodiments may provide a set of inputs to the prediction model, as indicated by block 310. The prediction model may be one of various types of prediction models, and may include various types of rule-based models, statistical models, machine learning models, hybrid models combining different types of models, etc. For example, in some embodiments, a prediction model may include a first portion that is rule-based and a second portion that is based on a set of neural network layers to formulate a prediction.

In some embodiments, the set of inputs provided to a production model may have been used to determine the explainability parameters for the prediction model. Alternatively, or additionally, some embodiments may use other inputs when determining the explainability parameters for the prediction model. For example, some embodiments may provide a prediction model with a series of inputs to determine explainability parameters for each feature of the series of inputs. Some embodiments may then provide the prediction model with a new set of inputs to determine a prediction, where the series of inputs used to determine explainability parameters does not include the new set of inputs.

Some embodiments may determine a set of input effect indicators associated with the prediction model and the set of inputs to increase the likelihood of obtaining a target prediction, as indicated by block 316. An input effect indicator may include a conditional that indicates a change to a feature value of an input that, if implemented, would cause a prediction model that had previously predicted the set of inputs to result in a first prediction to instead predict a second prediction as a result of the change to the feature value. Some embodiments may determine whether a set of inputs would result in a target prediction when provided to a prediction model and, if not, may determine the set of input effect indicators to obtain or at least increase the likelihood of obtaining the target prediction.

Some embodiments may generate the plurality of conditionals using one or more conditional generation models. Furthermore, some embodiments may generate the plurality of conditionals based on a corresponding plurality of the local explainability parameters and a target prediction. Some embodiments may use one or more methods of a variety of methods to determine conditionals. For example, some embodiments may implement a rule-based perturbation that includes using pre-determined rules to modify a feature value. In some embodiments, the selected feature value that is perturbed may be determined based on a set of explainability parameters.

Some embodiments may also apply a generative model, such as a generative adversarial network (GAN) or an autoencoder, to generate one or more conditionals. For example, some embodiments may train a GAN with a set of training input feature values and training predictions, where a generator portion of a GAN may be trained to generate synthetic instances and the discriminator portion of the GAN may be trained to distinguish between real and synthetic instances. Once trained, some embodiments may use a GAN to generate synthetic input sets that correspond with a target prediction. In some embodiments, the generator portion of the GAN may also use explainability parameters as inputs to influence which input feature to modify.

Some embodiments may implement a causal inference operation to determine a set of quantitative effects based on a pre-configured set of causal relations between features of a set of inputs and a prediction made by a prediction model based on the set of inputs. For example, some embodiments may be pre-configured to indicate that a polynomial relationship exists between a first feature, a second feature, and a prediction value, where some embodiments may perform fitting operations to infer quantitative parameters for the polynomial relationship.

Some embodiments may generate additional feature effect indicators based on derivative values, where the derivative values may be determined as numeric derivatives. For example, some embodiments may determine a set of derivative values associated with each feature of a set of inputs, where the derivatives may be determined in a feature space of the set of inputs, and where the derivative values may be based on the nearest neighbors of the set of inputs in the feature space. The nearest neighbor input sets in the feature space may be obtained in real time or may be obtained from a database storing previously used inputs. Some embodiments may determine a candidate set of inputs by modifying an initial set of inputs based on the derivative values of the initial set inputs. For example, some embodiments may add modification values based on the derivative value to the initial set of inputs to determine the candidate set of inputs, where the modification values may be determined as a product of normalized derivative values and a distance metric between the initial set of inputs and a nearest neighboring set of inputs in the feature space. Some embodiments may then use the candidate set of inputs to determine a candidate conditional using one or more operations described in this disclosure. Some embodiments may then use the candidate conditional to generate a phrase for summarization operations, as described elsewhere in this disclosure.

Alternatively, or additionally, some embodiments may use optimization-based operations to determine a set of conditionals. An optimization-based operation may include operations to search within a feature space of a prediction model for feature values satisfying a set of constraints within the feature space and to minimize an objective function. For example, some embodiments may use an iterative gradient-based optimization algorithm to search within the feature space to minimize an objective function, where an initial set of inputs may be represented by a vector in the feature space and used as a starting position of the gradient-based optimization algorithm. Some embodiments may then use the set of solutions in the feature space for the objective function as a set of candidate inputs and then generate a set of conditionals based on the set of candidate inputs using a conditional generation model to generate the set of conditionals. Furthermore, some embodiments may distinguish these generated candidate inputs from other user-provided inputs for later training operations based on the generated candidate inputs.

Some embodiments may determine a plurality of phrases based on the set of input effect indicators, as indicated by block 322. The plurality of phrases may be provided in one or more various types of natural language statements, where each phrase of the plurality of phrases may be associated with one or more input effect indicators. Furthermore, each phrase of the plurality of phrases may be associated with a different input effect indicator. For example, some embodiments may generate a set of 1,000 input effect indicators. Some embodiments may then generate 1,000 corresponding phrases for the 1,000 input effect indicators.

A phrase generated from an input effect indicator may include a natural language phrase, a natural language sentence, a set of sentences, a paragraph, etc. For example, some embodiments may provide a set of phrases that includes a set of sentences, where each sentence may include a subject including a feature name or a feature value and a verb. For example, some embodiments may generate the phrase "debt-to-income ratio should be increased" based on a conditional indicating that, relative to an actual set of inputs, a feature value representing a debt-to-income ratio should be increased.

Some embodiments may generate phrases based on a set of feature values with respect to pre-established rules. For example, some embodiments may apply a prediction model that categorizes a user with a predicted category based on a determination that a value of a specified feature of the set of inputs for the prediction model exceeds a threshold. In some embodiments, the generated phrase may indicate a relationship with respect to the threshold. For example, some embodiments may use a rule-based method to generate a phrase "DTI exceeds threshold" based on a determination that a value associated having the title "DTI" provided by or calculated from of a set of inputs exceeds a threshold of a prediction model used to predict whether a first prediction value or a second prediction value will be predicted by the prediction model.

Some embodiments may generate a summarization using a generative model. For example, some embodiments may pre-train a language model based on a training set of input feature values and their corresponding training phrases. Some embodiments may then initialize a hidden state of a generative model based on an input set and predict tokens or other representations of words or portions of words in sequence based on the preceding tokens of the sequence.

Some embodiments may perform operations to detect correlated features between the features of an input set. Various types of operations may be performed to determine a feature relationship metric indicating a correlation or covariance between a pair of features. Some embodiments may determine a feature relationship metric based on a previously determined correlation coefficient between the pair of features, a covariance between the pair of features, computing a correlation relationship between the pair of features, etc. Some embodiments may then determine whether the feature relationship metric satisfies a threshold and, in response to a determination that the quantitative relationship satisfies the metric, perform operations to remove repetitive information. For example, after obtaining a set of inputs, some embodiments may retrieve a correlation table value based on a first feature of a first input of the set of inputs and a second feature of a second input of the set of inputs. Some embodiments may then determine a correlation status between first and second inputs based on the correlation table value in the retrieved correlation table by comparing the correlation table value corresponding with the first and second inputs with a correlation threshold. Some embodiments may also use the correlation table value as a feature relationship metric for other operations described in this disclosure.

Some embodiments may remove feature effect indicators from inputs used for phrase generation based on a relationship metric between two or more features. For example, a computer system may compute or otherwise obtain a result indicating that a first feature is highly correlated with a second feature based on a feature relationship metric and thus that the inputs for these features are correlated inputs, where a first conditional is associated with the first feature, and where a second conditional is associated with the second feature. In response, the computer system may remove an input effect indicator associated with the second feature from the plurality of input effect indicators used to determine a corresponding set of phrases. For example, some embodiments may remove a conditional associated with the second feature from the plurality of features used to generate phrases such that some embodiments may provide a first phrase generated with the use of the first conditional and not provide any phrases generated with the use of the second conditional.

Some embodiments may remove feature effect indicators from a plurality of feature effect indicators for other reasons. Some embodiments may use a feature effect threshold to determine whether an indicated feature effect is too great to be relevant for a summarization. For example, if a first conditional indicates that a feature value should be increased by 1,000 to result in a prediction model predicting a target prediction, and the feature value ordinarily would vary by less than this amount, the first conditional or phrases generated using the first conditional may be removed from consideration before a summarization operation. To test for whether a feature effect is too great, some embodiments may use a feature effect threshold. For example, some embodiments may determine that a conditional that recommends an increase of a feature value by 1,000 exceeds a feature effect threshold equal to 100. Furthermore, as a result of this determination, some embodiments may remove the first conditional from a plurality of conditionals that will be used to generate phrases. In some embodiments, the feature effect threshold for a feature may vary based on the threshold and may be retrieved from a database or other data structure that associates features with corresponding feature effect thresholds. For example, some embodiments may retrieve a first feature effect threshold equal to 1.02 for a first feature and a second feature effect threshold equal to 2.01 for a second feature. Furthermore, some embodiments may obtain multiple values for use as thresholds for a feature, such as a first value to represent a lower bound for the feature and a second value to represent an upper bound for the feature.

Some embodiments may retrieve a knowledge graph based on a set of inputs, where the knowledge graph may include vertices representing tokens, sequences of tokens, and other types of information. For example, some embodiments may retrieve a knowledge graph based on metadata stored in association with a set of inputs. Some embodiments may then update feature effect indicators used to generate phrases based on the knowledge graph. For example, some embodiments may convert the feature effect indicator "DTI=>+0.4" into the text "Delta Tau Indigo should be increased by 0.4" based on an association between the token "DTI" and the token sequence "Delta Tau Indigo" in the knowledge graph. Alternatively, some embodiments may use a knowledge graph related to financial information, where DTI may map to the term "debt-to-income ratio," and inputs from the set of inputs may be mapped to features representing income, debt, credit, cash flow, amount in a bank record, etc. For example, the knowledge graph may limit an amount of income increase for a counterfactual to a certain threshold before being a violation of a rule.

Some embodiments may assign priority values to the plurality of phrases based on the local explainability parameters, as indicated by block 328. Some embodiments may use local explainability parameters directly as priority values. Alternatively, some embodiments may sort the local explainability parameters and use the ranking result of the sorting operation as a corresponding set of priority values for their respective phrases. For example, a computer system may use a set of inputs to generate multiple conditionals, where each respective conditional of the multiple conditionals indicates one or more inputs (e.g., by indicating the feature name(s) or a feature value(s) of the one or more inputs). Some embodiments may then assign priority values to each respective conditional based on one or more corresponding explainability parameters associated with the respective indicated input of the conditional. In many cases, the priority value assigned to a conditional of a set of conditionals may be a lesser value or greater value based on a lesser or greater local explainability parameter, respectively. By letting an explainability parameter govern or otherwise affect the priority value of a conditional or a feature associated with the feature, some embodiments may thus use a reproducible method of emphasizing the importance of certain features for generating summarizations.

In some embodiments, a computer system may determine a set of SHAP values for features of a prediction model to generate a conditional as an input effect indicator, where the conditional is associated with a first feature of the input effect indicator. The computer system may then generate a phrase based on the conditional using a rule-based operation or generative model, where the phrase is thus associated with the first feature. The computer system may then assign a priority value to the generated phrase based on the SHAP value of the first feature, and then repeat this set of operations for some or all of the other features of an input for a prediction model.

Some embodiments may modify priority values based on a relationship metric between two or more features. For example, a computer system may compute or otherwise obtain a result indicating that the set of inputs for a pair of features are a set of correlated inputs, where a first conditional is associated with a first feature of the pair of features, and where a second conditional is associated with a second feature of the pair of features. In response, the computer system may increase a priority value associated with the second feature effect indicator as a result of the association between the second feature effect indicator and the second feature and the association between the second feature and the set of correlated inputs. For example, the computer system may increase a priority value associated with a second conditional associated with the second feature. As described elsewhere in this disclosure, increasing a priority value may increase the likelihood that a summarization will include an indicator of the feature associated with the priority value.

Some embodiments may generate a summarization based on the plurality of phrases and the local explainability parameters, as indicated by block 334. Some embodiments may generate a summarization that is associated with the set of inputs by providing an LLM with the plurality of phrases. Some embodiments may deduplicate phrases in the plurality of phrases, remove phrases associated with correlated features, or perform other operations to reduce a total number of phrases provided to the LLM. For example, some embodiments may modify the input to an LLM or a parameter used to configure the LLM based on a number times that a phrase is duplicated. For example, some embodiments may generate the same phrase multiple times for an input set based on a set of related inputs, detecting highly correlated relations between input features, etc. Some embodiments may then deduplicate the multiple phrases and provide the deduplicated phrase and the number of times the phrase was repeated to the LLM for summarization. Further, some embodiments may forgo generating priority values and instead provide a plurality of phrases to an LLM to generate summarizations without providing any priority values to the LLM or otherwise using priority values.

Some embodiments may have access to different types of LLM or different configurations of LLMs, where the different types of LLMs may be specific to a particular context. For example, some embodiments may have access to a first LLM that was trained or augmented with medical-specific terms and a second LLM that was trained or augmented with finance-specific terms. Some embodiments may then select which LLM for use based on a context value. Some embodiments may determine a context value based on metadata provided with an input, such as user information of a user that provided the input, or may determine the context value from one or more values of an input set. For example, based on a determination that a first value of an input set recites "blue," some embodiments may select a first LLM for summarization operations instead of a second LLM for summarization operations.

Some embodiments may use an LLM to generate a plurality of summarizations, where each summarization may be associated with a set of confidence values. For example, some embodiments may provide a set of requests that include a set of phrases to an API server and obtain five different summarizations and an associated set of confidence values that is associated with the five different summarizations. Some embodiments may then filter the five different summarizations to select one or more of the summarizations for display based on a determination that the confidence values of the selected summarizations satisfy a confidence value threshold or other set of criteria. Furthermore, some embodiments may use a reinforcement-learning architecture to select a target summarization from a plurality of summarizations based on a reward function that uses both their corresponding confidence values and a learning parameter that increases exploration. Some embodiments may then provide learning feedback to an LLM based on an indication of whether the summarization is indicated to be satisfactory or not satisfactory by a user or an automated system.

Furthermore, after using an LLM to generate a plurality of summarizations, some embodiments may provide the plurality of summarizations to a rules engine or other decision system that incorporates rules to filter one or more summarizations from the multiple summarizations. For example, some embodiments may provide five different summarizations to a rules engine to determine whether each respective summarization of the five different summarizations satisfies a set of summarization criteria. Some embodiments may then filter out each summarization that does not satisfy the set of summarization criteria and use one or more of the remaining summarizations as a target summarization for storage or display. The set of criteria may include a requirement that the summarization include a particular token or sequence of tokens, include a particular value, not include a particular value, not include a particular token or sequence of tokens, etc. In some embodiments, a rules engine may be configured to change the set of criteria to apply to a summarization based on the features of a set of inputs or values of the set of inputs.

Some embodiments may determine a summarization based on local explainability parameters by determining the summarization based on a set of priority values derived from the local explainability values. For example, a computer system may determine a set of priority values based on a corresponding set of local explainability parameters using operations described in this disclosure. The computer system may then provide the priority values to an LLM or use the priority values to modify one or more configuration parameters of the LLM. In some embodiments, increasing a priority value associated with a feature effect indicator or feature may increase the likelihood that a summarization will include an indicator of the feature associated with the priority value.

In some embodiments, training a text generation model to provide a summarization based on a set of inputs directly may have the benefit of providing summarizations without relying on intermediate phrase generation, which may be useful in time or resource-constrained computing environments. After generating the summarization from a set of phrases, some embodiments may store the summarization in a database of summarizations, where the summarization may be associated with the set of inputs used to generate the set of phrases in the database. Some embodiments may then use the stored summarization in conjunction with the set of phrases or the set of inputs to train a text generation model. In some embodiments, the text generation model being trained may be the text generation model used to generate the set of phrases.

After storing a summarization in association with a first set of inputs, some embodiments may receive a second set of inputs. Some embodiments may then use vector representations of each of the first and second set of inputs to determine a distance in a feature space that will then be used to determine whether to use the same summarization for the second set of inputs. For example, some embodiments may determine a first vector representation of a first set of inputs, such as by generating the vector "[1, 0, 0.523, 053]" to represent a set of feature values provided as a set of inputs. The first set of inputs may be used to generate a first plurality of conditionals or other feature effect indicators. Some embodiments may then determine summarization based on phrases generated from the plurality of conditionals and perform a caching operation to store the summarization in association with the first set of inputs, where the summarizations may be indexed by their corresponding vector representation. Some embodiments may then determine a second vector representation of a second set of inputs. Alternatively, some embodiments may determine a first vector representation based on a first set of feature effect indicators, such as a first set of conditionals derived from a first set of inputs. Similarly, some embodiments may determine a second vector representation based on a second set of feature effect indicators, such as a first set of conditionals derived from a first set of inputs. By using feature effect indicators to generate vector representations that will be used to determine whether to use a summarization system, some embodiments may accurately provide previously generated summarizations even in cases where input sets may be different.

After determining first and second vector representations, some embodiments may determine a similarity score between the first and second set of inputs or first and second set of conditionals by determining a feature space distance between the first and second vector representations. Some embodiments may perform a comparison operation to obtain a result indicating that the similarity score satisfies a similarity threshold and, in response, retrieve a previously stored summarization from a data structure, where the data structure may indicate an association between the previously stored summarization and the first set of inputs. By using a previously stored summarization based on a determination that a similarity score satisfies a similarity threshold, some embodiments may reduce reliance on an LLM and associated computing resource costs.

Alternatively, or additionally, some embodiments may save on computation costs by using the same phrases for a new use of an LLM. For example, some embodiments may obtain a result indicating that a similarity score satisfies a similarity threshold, where the similarity score may be based on a first plurality of conditionals and a second plurality of conditionals. In response, some embodiments may retrieve a previously generated set of natural language phrases associated with the first set of inputs or the first set of conditionals. Some embodiments may then provide the previously generated phrases to an LLM, such as by sending the natural language phrases to an API of an API server via a set of requests. Some embodiments may then obtain a new summarization in response to the set of requests, where the new summarization may then be displayed or stored in association with the second plurality of conditionals.

Furthermore, some embodiments may test viability of an LLM by determining that one or more features indicated to be important by a set of local explainability models associated with a prediction model are identified in a summarization. For example, some embodiments may determine a first set of local explainability parameters for a prediction based on a set of inputs. Some embodiments may then select a priority feature based on a ranking of the first set of local explainability parameters indicating the priority feature (e.g., selecting a top-ranked feature, randomly selecting from the top three ranked features, etc.). Some embodiments may then generate a set of phrases based on the set of inputs and provide the set of phrases to an LLM model to generate a plurality of summarizations. After obtaining the plurality of summarizations, some embodiments may then apply a set of criteria to filter the plurality of summarizations to determine a subset of summarizations that indicates the priority feature. Some embodiments may then select a target summarization from the subset of summarizations to present on a UI or store in a database of selected summarizations.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods described in this disclosure is not intended to be limiting.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, machine-readable media, such as an electronic storage medium. Furthermore, the use of the term "media" may include a single medium or combination of multiple media, such as a first medium and a second medium. A set of non-transitory, machine-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-126 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 121-126 may provide more or less functionality than is described. For example, one or more of subsystems 121-126 may be eliminated, and some or all of its functionality may be provided by other ones of subsystems 121-126. As another example, additional subsystems may be programmed to perform some or all of the functionality attributed herein to one of subsystems 121-126 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

The present techniques will be better understood with reference to the following enumerated embodiments:

1. A method comprising: determining a plurality of local explainability parameters for a set of inputs using a local explainability model by providing a prediction model with the set of inputs; generating a plurality of conditionals for a target prediction based on the plurality of local explainability parameters; assigning priority values to the plurality of conditionals based on the plurality of local explainability parameters; generating a plurality of natural language phrases based on the plurality of conditionals by using a text generation model; and generating a summarization using a large language model based on the plurality of natural language phrases and the priority values.

2. A method comprising: determining a plurality of local explainability parameters for a set of inputs using a local explainability model by providing a prediction model with the set of inputs, wherein the prediction model outputs a first prediction based on the set of inputs, and wherein the first prediction does not match a target prediction; generating a plurality of conditionals indicating changes to the set of inputs to output the target prediction of the prediction model based on the plurality of local explainability parameters and the target prediction; assigning priority values to the plurality of conditionals based on the plurality of local explainability parameters and a respective indicated input of each respective conditional of the plurality of conditionals, wherein a first conditional is assigned a greater value than a second conditional based on a result indicating that the first conditional indicates an input associated with a greater local explainability parameter than any local explainability parameters of any inputs indicated by the second conditional; generating a plurality of natural language phrases by providing, to a text generation model, the plurality of conditionals as a set of model inputs; and generating a summarization associated with the set of inputs by providing a large language model with the plurality of natural language phrases generated from the plurality of conditionals and the priority values.

3. A method comprising: determining a plurality of local explainability parameters for a set of inputs using a local explainability model by providing a prediction model with the set of inputs; generating a plurality of conditionals for a target prediction of the prediction model based on the plurality of local explainability parameters and the target prediction; assigning priority values to the plurality of conditionals based on the plurality of local explainability parameters and a respective indicated input of each respective conditional of the plurality of conditionals; generating a plurality of natural language phrases based on the plurality of conditionals by using a text generation model; and generating a summarization associated with the set of inputs by using a large language model based on the plurality of natural language phrases and the priority values.

4. The method of any of embodiments 1 to 3, further comprising providing a parameter to the large language model, wherein the parameter indicates a weight assigned to duplicate phrases of the plurality of natural language phrases.

5. The method of any of embodiments 1 to 4, further comprising removing a first conditional from the plurality of conditionals in response to a result indicating that the first conditional and a second conditional of the plurality of conditionals share a set of correlated inputs.

6. The method of embodiment 5, further comprising increasing a priority value associated with the second conditional based on the result indicating that the first conditional and the second conditional of the plurality of conditionals share the set of correlated inputs.

7. The method of any of embodiments 5 to 6, wherein the set of correlated inputs comprises a first input of the first conditional and a second input of the second conditional, further comprising: retrieving a correlation table value based on the first input and the second input; and determining a correlation status of the set of correlated inputs based on the correlation table value and a correlation threshold.

8. The method of any of embodiments 1 to 7, wherein the local explainability model is a Local Interpretable Model-Agnostic Explanations (LIME) model, and wherein the plurality of local explainability parameters comprises a set of feature weights corresponding with the set of inputs.

9. The method of any of embodiments 1 to 8, wherein the local explainability model is a Shapley Additive Explanations (SHAP) model, and wherein the plurality of local explainability parameters comprises a set of Shapley values.

10. The method of any of embodiments 1 to 9, further comprising: retrieving a set of thresholds associated with at least one input of the set of inputs; determining, for a first conditional of the plurality of conditionals, whether the first conditional satisfies the set of thresholds; and removing the first conditional from the plurality of conditionals based on a result indicating that the first conditional does not satisfy the set of thresholds.

11. The method of any of embodiments 1 to 10, further comprising: storing the summarization in a database; associating the summarization with the set of inputs in the database; and training the text generation model with a training set comprising the summarization and the set of inputs.

12. The method of any of embodiments 1 to 11, further comprising: determining a context value associated with at least one input of the set of inputs, wherein generating the summarization comprises providing the large language model with the context value.

13. The method of any of embodiments 1 to 12, wherein the summarization is a target summarization, and wherein generating the summarization comprises: sending, via a set of requests, the plurality of natural language phrases to an application programming interface (API) of an API server; obtaining, via a response from the API server, a plurality of summarizations and an associated set of confidence values; and obtaining the target summarization by filtering the plurality of summarizations based on the associated set of confidence values.

14. The method of any of embodiments 1 to 13, wherein: the summarization is a target summarization; the set of inputs is associated with a set of summarization criteria; and generating the summarization comprises: obtaining a plurality of summarizations; and obtaining the target summarization by providing the plurality of summarizations to a rules engine, wherein the rules engine is configured to filter out summarizations that do not satisfy the set of summarization criteria.

15. The method of any of embodiments 1 to 14, wherein the plurality of conditionals is a first plurality of conditionals, the method further comprising: generating a first vector representation based on the first plurality of conditionals; caching the summarization in association with an index based on the first vector representation; generating a second plurality of conditionals based on a second set of inputs; determining a similarity score between the first plurality of conditionals and the second plurality of conditionals based on a comparison with a second vector representation associated with the second plurality of conditionals; and retrieving the summarization based on a result indicating that the similarity score satisfies a similarity threshold.

16. The method of embodiment 15, further comprising determining a second similarity score between the first plurality of conditionals and a previously generated plurality of conditionals based on a comparison with a previous vector representation associated with the previously generated plurality of conditionals, the method further comprising: sending, via a set of requests, the plurality of natural language phrases to an application programming interface (API) of an API server based on a result indicating that the second similarity score does not satisfy the similarity threshold; and obtaining, via a response from the API server, a second summarization.

17. The method of any of embodiments 1 to 16, wherein the summarization is a target summarization, and wherein generating the target summarization comprises: selecting a priority feature based on the set of inputs and the plurality of local explainability parameters; obtaining a plurality of summarizations; and selecting the target summarization of the plurality of summarizations based on a result indicating that the priority feature is indicated in the target summarization.

18. The method of any of embodiments 1 to 17, wherein the set of inputs is a first set of inputs, and wherein generating the plurality of conditionals comprises: determining a set of derivative values associated with each feature indicated by the set of inputs for the prediction model; generating a candidate set of inputs based on the set of inputs, the set of derivative values, and a distance metric; and generating a conditional of the plurality of conditionals based on the candidate set of inputs.

19. The method of any of embodiments 1 to 18, further comprising: obtaining an objective function indicating the target prediction; iteratively generating candidate inputs by using the set of inputs as a starting position to minimize the objective function with respect to a generated candidate input by using a gradient-based optimization algorithm; and generating a conditional of the plurality of conditionals based on a first candidate input in response to a result indicating that the prediction model outputs the target prediction when provided with the first candidate input.

20. The method of any of embodiments 1 to 19, further comprising: retrieving a knowledge graph associated with at least one feature of the set of inputs; and updating the plurality of conditionals based on associations between features of the set of inputs and terms stored in vertices of the knowledge graph, wherein generating the plurality of natural language phrases comprises generating the plurality of natural language phrases after updating of the plurality of conditionals.

21. One or more tangible, non-transitory, machine-readable media storing instructions that, when executed by a set of processors, cause the set of processors to effectuate operations comprising those of any of embodiments 1-20.

22. A system comprising: a set of processors and memory storing computer program instructions that, when executed by the set of processors, cause the set of processors to effectuate operations comprising those of any of embodiments 1-20.

What is claimed is:

1. A system for generating summarizations using a text generation model, the system comprising one or more processors and a memory storing program instructions that, when executed by the one or more processors, causes the one or more processors to perform operations comprising:

determining a plurality of local explainability parameters for a set of inputs using a local explainability model by providing a prediction model with the set of inputs, wherein the prediction model outputs a first prediction based on the set of inputs, and wherein the first prediction does not match a target prediction;

generating a plurality of conditionals indicating changes to the set of inputs to output the target prediction of the prediction model based on the plurality of local explainability parameters and the target prediction;

assigning priority values to the plurality of conditionals based on the plurality of local explainability parameters and a respective indicated input of each respective conditional of the plurality of conditionals, wherein a first conditional is assigned a greater value than a second conditional based on a result indicating that the first conditional indicates an input associated with a greater local explainability parameter than any local explainability parameters of any inputs indicated by the second conditional;

generating a plurality of natural language phrases by providing, to a text generation model, the plurality of conditionals as a set of model inputs; and generating a summarization associated with the set of inputs by providing a large language model with the plurality of natural language phrases generated from the plurality of conditionals and the priority values.

2. A method comprising:

determining a plurality of local explainability parameters for a set of inputs using a local explainability model by providing a prediction model with the set of inputs;

generating a plurality of conditionals for a target prediction of the prediction model based on the plurality of local explainability parameters and the target prediction;

assigning priority values to the plurality of conditionals based on the plurality of local explainability parameters and a respective indicated input of each respective conditional of the plurality of conditionals;

generating a plurality of natural language phrases based on the plurality of conditionals by using a text generation model; and generating a summarization associated with the set of inputs by using a large language model based on the plurality of natural language phrases and the priority values.

3. The method of claim 2, further comprising providing a parameter to the large language model, wherein the parameter indicates a weight assigned to duplicate phrases of the plurality of natural language phrases.

4. The method of claim 2, further comprising removing a first conditional from the plurality of conditionals in response to a result indicating that the first conditional and a second conditional of the plurality of conditionals share a set of correlated inputs.

5. The method of claim 4, further comprising increasing a priority value associated with the second conditional based on the result indicating that the first conditional and the second conditional of the plurality of conditionals share the set of correlated inputs.

6. The method of claim 4, wherein the set of correlated inputs comprises a first input of the first conditional and a second input of the second conditional, further comprising:

retrieving a correlation table value based on the first input and the second input; and determining a correlation status of the set of correlated inputs based on the correlation table value and a correlation threshold.

7. The method of claim 2, wherein the local explainability model is a Local Interpretable Model-Agnostic Explanations (LIME) model, and wherein the plurality of local explainability parameters comprise a set of feature weights corresponding with the set of inputs.

8. The method of claim 2, wherein the local explainability model is a Shapley Additive Explanations (SHAP) model, and wherein the plurality of local explainability parameters comprises a set of Shapley values.

9. The method of claim 2, further comprising:

retrieving a set of thresholds associated with at least one input of the set of inputs;

determining, for a first conditional of the plurality of conditionals, whether the first conditional satisfies the set of thresholds; and removing the first conditional from the plurality of conditionals based on a result indicating that the first conditional does not satisfy the set of thresholds.

10. The method of claim 2, further comprising:

storing the summarization in a database;

associating the summarization with the set of inputs in the database; and training the text generation model with a training set comprising the summarization and the set of inputs.

11. The method of claim 2, further comprising:

determining a context value associated with at least one input of the set of inputs, wherein generating the summarization comprises providing the large language model with the context value.

12. A set of non-transitory, machine-readable media storing program instructions that, when executed by one or more processors, causes the one or more processors to perform operations comprising:

determining a plurality of local explainability parameters for a set of inputs using a local explainability model by providing a prediction model with the set of inputs;

generating a plurality of conditionals for a target prediction based on the plurality of local explainability parameters;

assigning priority values to the plurality of conditionals based on the plurality of local explainability parameters;

generating a plurality of natural language phrases based on the plurality of conditionals by using a text generation model; and generating a summarization using a large language model based on the plurality of natural language phrases and the priority values.

13. The set of non-transitory, machine-readable media of claim 12, wherein the summarization is a target summarization, and wherein generating the summarization comprises:

sending, via a set of requests, the plurality of natural language phrases to an application programming interface (API) of an API server;

obtaining, via a response from the API server, a plurality of summarizations and an associated set of confidence values; and obtaining the target summarization by filtering the plurality of summarizations based on the associated set of confidence values.

14. The set of non-transitory, machine-readable media of claim 12, wherein:

the summarization is a target summarization;

the set of inputs is associated with a set of summarization criteria; and generating the summarization comprises:

obtaining a plurality of summarizations; and obtaining the target summarization by providing the plurality of summarizations to a rules engine, wherein the rules engine is configured to filter out summarizations that do not satisfy the set of summarization criteria.

15. The set of non-transitory, machine-readable media of claim 12, wherein the plurality of conditionals is a first plurality of conditionals, the operations further comprising:

generating a first vector representation based on the first plurality of conditionals;

caching the summarization in association with an index based on the first vector representation;

generating a second plurality of conditionals based on a second set of inputs;

determining a similarity score between the first plurality of conditionals and the second plurality of conditionals based on a comparison with a second vector representation associated with the second plurality of conditionals; and retrieving the summarization based on a result indicating that the similarity score satisfies a similarity threshold.

16. The set of non-transitory, machine-readable media of claim 15, further comprising determining a second similarity score between the first plurality of conditionals and a previously generated plurality of conditionals based on a comparison with a previous vector representation associated with the previously generated plurality of conditionals, the operations further comprising:

sending, via a set of requests, the plurality of natural language phrases to an application programming interface (API) of an API server based on a result indicating that the second similarity score does not satisfy the similarity threshold; and obtaining, via a response from the API server, a second summarization.

17. The set of non-transitory, machine-readable media of claim 12, wherein the summarization is a target summarization, and wherein generating the target summarization comprises:

selecting a priority feature based on the set of inputs and the plurality of local explainability parameters;

obtaining a plurality of summarizations; and selecting the target summarization of the plurality of summarizations based on a result indicating that the priority feature is indicated in the target summarization.

18. The set of non-transitory, machine-readable media of claim 12, wherein the set of inputs is a first set of inputs, and wherein generating the plurality of conditionals comprises:

determining a set of derivative values associated with each feature indicated by the set of inputs for the prediction model;

generating a candidate set of inputs based on the set of inputs, the set of derivative values, and a distance metric; and generating a conditional of the plurality of conditionals based on the candidate set of inputs.

19. The set of non-transitory, machine-readable media of claim 12, further comprising:

obtaining an objective function indicating the target prediction;

iteratively generating candidate inputs by using the set of inputs as a starting position to minimize the objective function with respect to a generated candidate input by using a gradient-based optimization algorithm; and generating a conditional of the plurality of conditionals based on a first candidate input in response to a result indicating that the prediction model outputs the target prediction when provided with the first candidate input.

20. The set of non-transitory, machine-readable media of claim 12, further comprising:

retrieving a knowledge graph associated with at least one feature of the set of inputs; and updating the plurality of conditionals based on associations between features of the set of inputs and terms stored in vertices of the knowledge graph, wherein generating the plurality of natural language phrases comprises generating the plurality of natural language phrases after updating of the plurality of conditionals.

* * * * *